United States Patent [19]
Barton

[11] Patent Number: 6,031,535
[45] Date of Patent: Feb. 29, 2000

[54] NODAL MODEL FOR STATUS BASED DYNAMIC DISPLAY OF USER INTERFACE CONTROLS

[75] Inventor: Terence E. Barton, Mountain View, Calif.

[73] Assignee: Sun Microsystems, Inc., Mountain View, Calif.

[21] Appl. No.: 08/675,434

[22] Filed: Jun. 27, 1996

[51] Int. Cl.[7] .................................................. G06F 3/14
[52] U.S. Cl. .............................................................. 345/354
[58] Field of Search ..................................... 395/354, 335, 395/333, 334, 339, 346, 348, 326, 338, 336; 345/354, 335, 333, 334, 339, 346, 348, 326, 338, 336

[56] References Cited

U.S. PATENT DOCUMENTS

| | | | |
|---|---|---|---|
| 5,295,242 | 3/1994 | Mashruwala et al. | 345/356 |
| 5,500,934 | 3/1996 | Austin et al. | 345/326 |
| 5,564,004 | 10/1996 | Grossman et al. | 345/348 |
| 5,586,239 | 12/1996 | Ueda | 707/513 |
| 5,630,081 | 5/1997 | Rybicki et al. | 345/349 |
| 5,644,334 | 7/1997 | Jones et al. | 345/419 |
| 5,704,051 | 12/1997 | Lane et al. | 345/357 |
| 5,845,122 | 12/1998 | Nielsen et al. | 345/354 |

*Primary Examiner*—Crescelle N. dela Torre
*Attorney, Agent, or Firm*—Blakely Sokoloff Taylor & Zafman

[57] ABSTRACT

A method and apparatus for controlling a graphical array of buttons in a graphical user interface. The method and apparatus models the buttons as nodes of a network and depending on pre-determined criteria and establishes links between nodes. The presence or absence of links between nodes sets status relationships between them. The selecting by a user of one button will change/maintain the status of other buttons depending on links or absence of links between corresponding nodes. When a sufficient number of buttons are selected, the user may initiate a task utilizing the status of the buttons.

14 Claims, 9 Drawing Sheets

NODAL MODEL FOR STATUS BASED DYNAMIC DISPLAY OF USER INTERFACE CONTROLS

BACKGROUND OF THE INVENTION

1. Field of the Invention

The present invention relates to the field of graphical user interfaces in computer systems. More specifically, the present invention is directed to controlling buttons and selection devices on graphical user interfaces.

2. Description of Related Art

In the art of graphical user interfaces within computer systems, buttons and icons are a basic well-known feature. Certain buttons, referred to as "radio buttons", are so called because, like their namesake in older vintage automobile AM radios, once pressed, they choose one specific option from a set of available options and override any prior choice in that set of buttons. In the radio context, as well as in the computer context, activating a given radio button changes only the buttons on that radio or on that "bank". Activation of a radio button has no effect on the status or choices available on another apparatus or another "bank" of radio buttons. The change that occurs on one radio button when another one is activated, is a single state change. Any button that was not selected, changes to the "not selected" state or remains in the "not selected" state. The button that was selected changes to or remains in the "selected" state. There are cases of problems where it is beneficial to relate the choices made from one "bank" of buttons to the choices available in other banks of buttons. A prior choice in one bank may make particular choices in other banks infeasible and thus these buttons should be unselectable. There currently exists software that indicates a choice is unselectable by "graying out" the button or menu item. Controlling a limited number of buttons on a small number of banks can be done with static case-based decision tables. Such programming quickly becomes cumbersome and tedious as the number of banks increases.

Further, once the software is written and compiled, there is no easy way of changing the relationships within the table without modifying the source code of the program. The problem is enhanced when the nature of the information which is to be chosen varies often as in the case of custom product configuration and the subsequent pricing thereof. Current utilization of buttons on a World-Wide Web (WWW) browser such as Netscape™ (A trademark of Netscape Communications Corp.) provide that when a radio button or "link" is activated, it may be shown as grayed out and become unselectable but such activation does not affect future choices. Thus, a simplified model and method is needed which can provide for inter-relating a graphical array of "banks" of buttons such that depending on the rules of a task, the choice of one button affects the status of other buttons in a user interface.

SUMMARY

The present invention is a method and apparatus for controlling the status of buttons based on previous button selections by a user in a graphical user interface. An array of buttons is arranged in banks, each bank corresponding to a category related to a task or problem. The array of buttons is modeled as a network of linked and unlinked nodes with each node representing a button.

The presence of a link between nodes of successive banks indicates that upon selecting the button corresponding to the node of one bank, the button corresponding to the node of the next bank continues to have a "selectable" status. The absence of a link between nodes of successive banks indicates that upon selecting a button corresponding to the node of one bank, the button corresponding to the node of the next bank will produce an "unselectable" status. A change or continuation in status of a button may be indicated by either the absence or presence of a link between the nodes corresponding to that button depending upon which technique more efficiently represents the relationships among buttons. When all links have been established in accordance with pre-determined criteria and rules for the categories of buttons, the array button model is considered complete.

When a graphical user interface displaying the array of buttons is initially invoked, the array of buttons is displayed to the user in a particular order and in a first color on a window of the graphical user interface. When a button in a first category (node of a first bank) is selected by the user, buttons in successive categories (nodes of successive banks) will be displayed in a second color indicating a change in status (from "selectable" to "unselectable", for example) if nodes corresponding to those buttons cannot trace back a path of links to the selected button in the first category. Alternatively, the presence of links rather then the absence of links can be the determining factor in changing or continuing the status of corresponding buttons, and thus, the color in which they are displayed. Further, the button selected by the user may be drawn in a third color to indicate to the user that it has the status of "selected". The process of selecting buttons and coloring other buttons based on prior selections is repeated by the user until a sufficient number of buttons is chosen to complete the task or problem. Once all the requisite buttons are selected, the selections made by the user will be submitted to another program or server for processing and executing the task or solving the problem in accordance with the selections made.

DETAILED DESCRIPTION OF THE INVENTION

Figure 1:
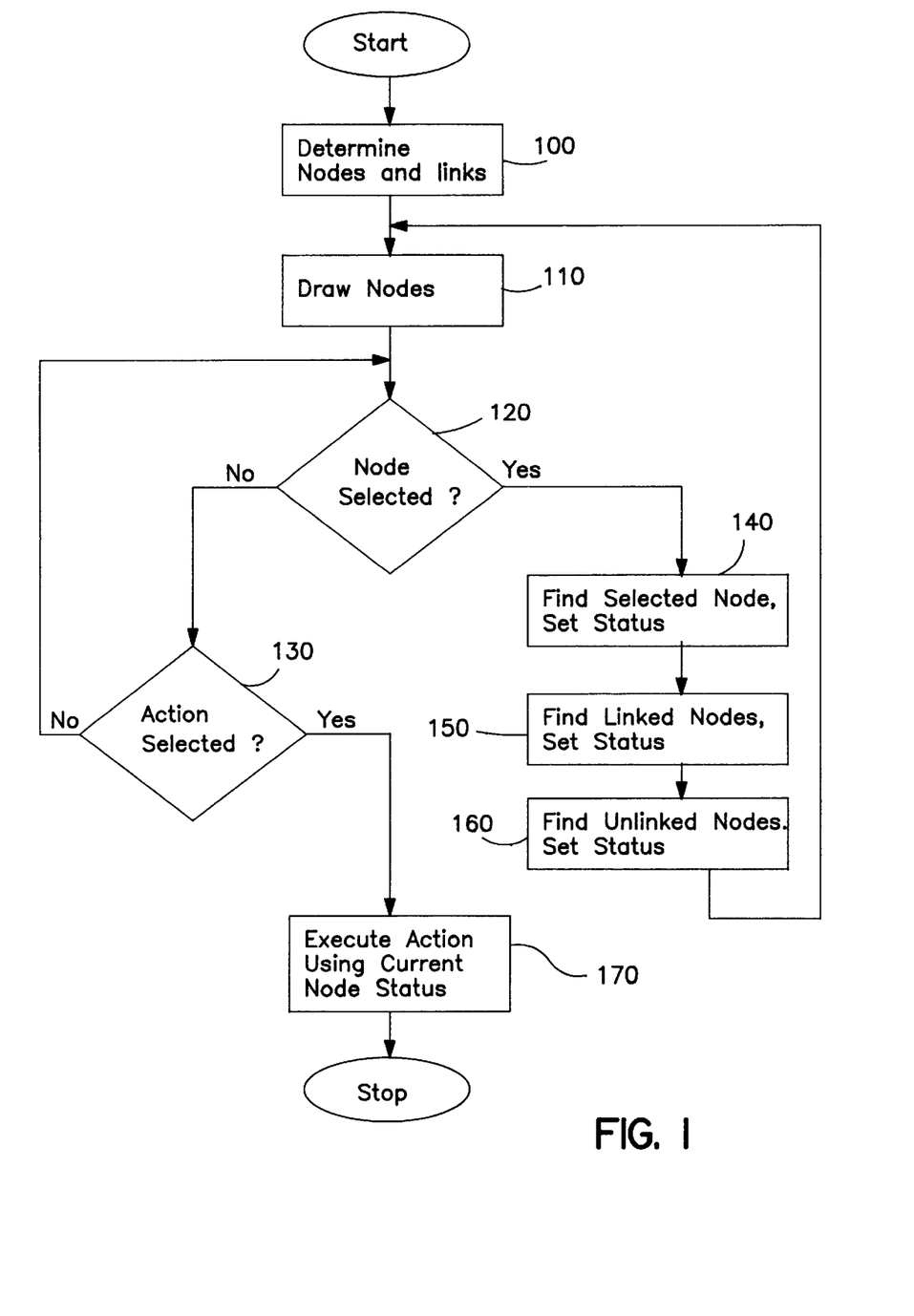
FIG. 1 is a flowchart of the method of controlling an interface of arrayed buttons according to the present invention.

FIG. 1 is a flowchart of the steps involved in controlling a graphical array of buttons on a user interface according to the present invention.

At step 100, all nodes and links between nodes are determined. This can be achieved by reading from a data file a list of nodes and their links and then representing the nodes and links using data structures such as a linked list of pointers and/or objects according to well-known software methods. Since the data file is external to the software modeling the buttons as nodes, the links may be modified at any time to thereby dynamically change the model. Further, the data for defining which nodes are linked in the nodal model may be from a server. The data file may simply be a list of buttons identified by number followed by a number corresponding to nodes to which they are linked. Alternatively, a set of rules or criteria can be used in a case-logic software method to allow the present invention to determine nodes and their links. After the nodes and links are determined, the buttons corresponding to the nodes are displayed (110) on the graphical user interface according to a status which each button has. At the initial invocation of the user interface and after step 100, the buttons are all drawn a first color, such as green, indicating that before the user has selected any button, all buttons have a "selectable" status.

At step 120, the software checks to see if a button (node) has been selected by the user. If a button is selected, then the status of the button is changed from "selectable" to "selected" according to step 140. Then, according to step 150, all nodes linked into the node corresponding to the selected button are located and the status of nodes linked to the selected node is also updated. In the example described below, the buttons corresponding to the linked nodes continue to have the status of "selectable" which they had at the initial invocation of the user interface. Likewise, according to step 160, all buttons corresponding to nodes unlinked or not linked to the button corresponding to the select node are located and have their status updated. In the example described below, the status of buttons corresponding to unlinked nodes (in relation to the selected node) would be set as "unselectable".

After step 160, the graphical user interface redisplays the array of buttons on the user interface according to their updated status. Thus, the button corresponding to the selected node would change from a green color to a pink color, indicating that it is no longer "selectable" but rather, "selected". Likewise, all buttons corresponding to linked nodes would remain colored green indicating, in one embodiment, their continued "selectable" status. The buttons corresponding to nodes unlinked or not linked to the node corresponding to the selected button, which now have a status of "unselectable", would be displayed in gray (grayed out) such that a user could not select them thereafter.

Steps 120, 140, 150 and 160 repeat until all or a sufficient number of buttons have been selected by the user in accordance with the task the user chooses to pursue. Once a task, such as submitting the selected buttons for processing, is initiated, then the action is executed according to the status of the buttons (170). The final status of the nodes indicates the button selection made by the user. In the example described below and in FIGS. 2–5, the user is accessing an interface and selecting buttons corresponding to a particular computer configuration. Once a task, such as "Submit for Pricing" in the example below, is initiated, the status of the buttons (nodes) is sent as parameters to a program which tabulates the price of the selected computer configuration and returns it to the user.

Figure 2:
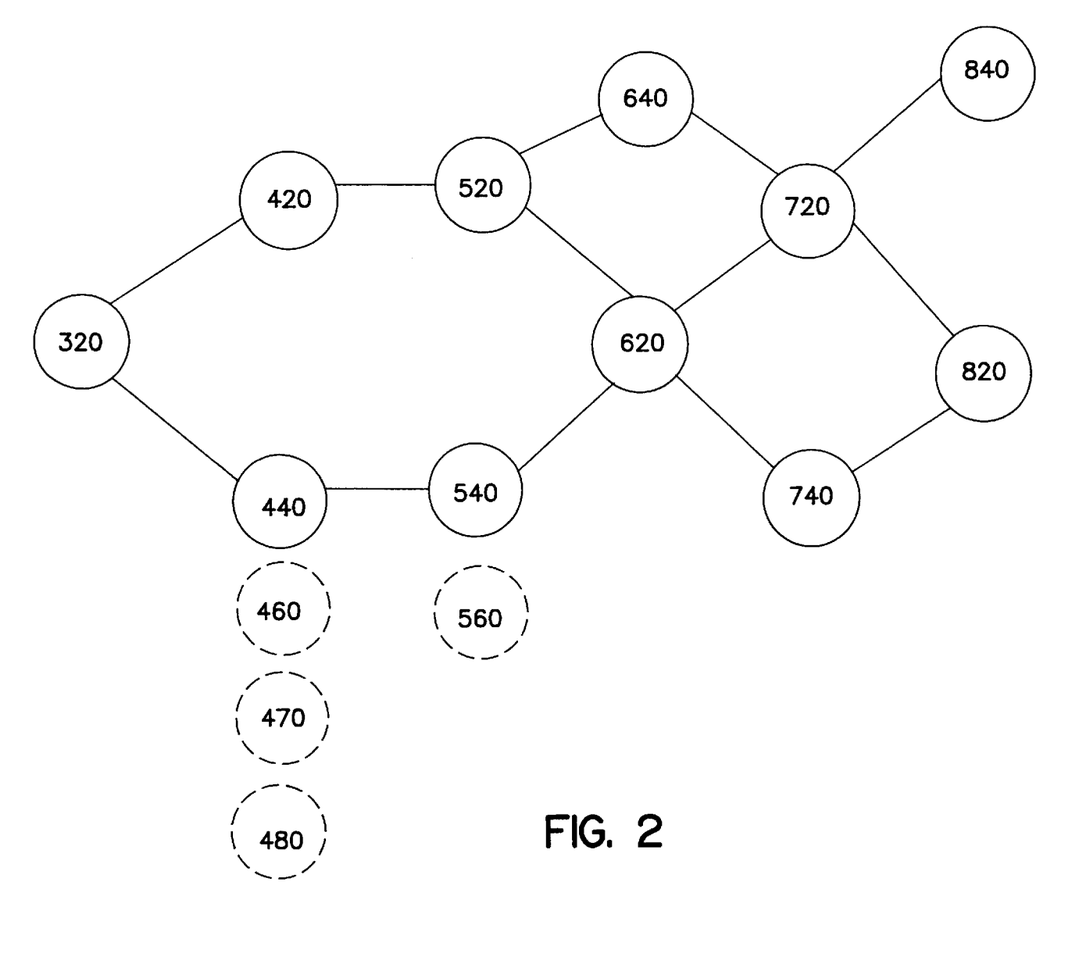
FIG. 2 is an exemplary nodal model representing status relations among buttons.
Figure 4:
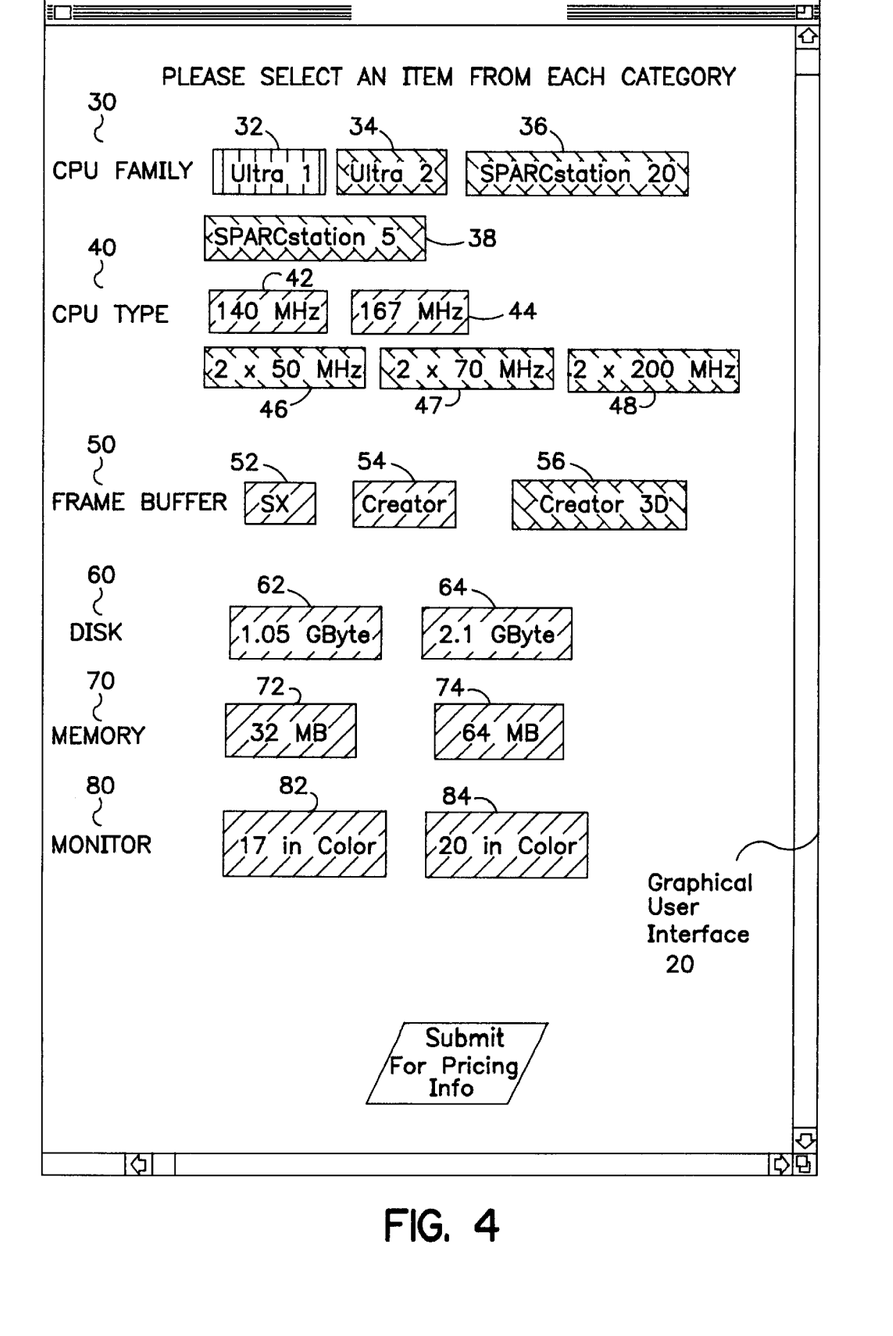
FIG. 4 is a screen capture of the interface when a button in the first category has been selected.

FIG. 2 illustrates a portion of a nodal model for an exemplary six bank graphical array of buttons given that the "Ultra 1" button (button 32) is first selected by the user as illustrated by FIG. 4. Each category is a bank of the graphical array and can be composed of one or more rows of buttons, with each button represented by a node in the nodal model.

Referring to FIG. 2, node 320, which corresponds to button 32 of FIG. 4, is shown as having a "link" to nodes 420 and 440. Nodes 420 and 440 correspond to buttons 42 and 44, respectively, of FIG. 4 and reside in the second bank of the array. Thus, a "link" between node 320 of the first bank and nodes 420 and 440 of the second bank represents their continued "selectable" status upon an initial selection of button 32. Also shown in FIG. 2 are nodes 460, 470 and 480, corresponding to buttons 46, 47 and 48 of FIG. 4, respectively, which reside in that bank. The nodes 460, 470 and 480 are unlinked (illustrated by dotted lines) to node 320. Therefore, when button 32 of FIG. 4 is initially selected, buttons 46, 47 and 48 turn gray and become "unselectable". In FIG. 4, when button 32 is selected, buttons 42 and 44 remain in green and are therefore, still selectable.

Figure 5:
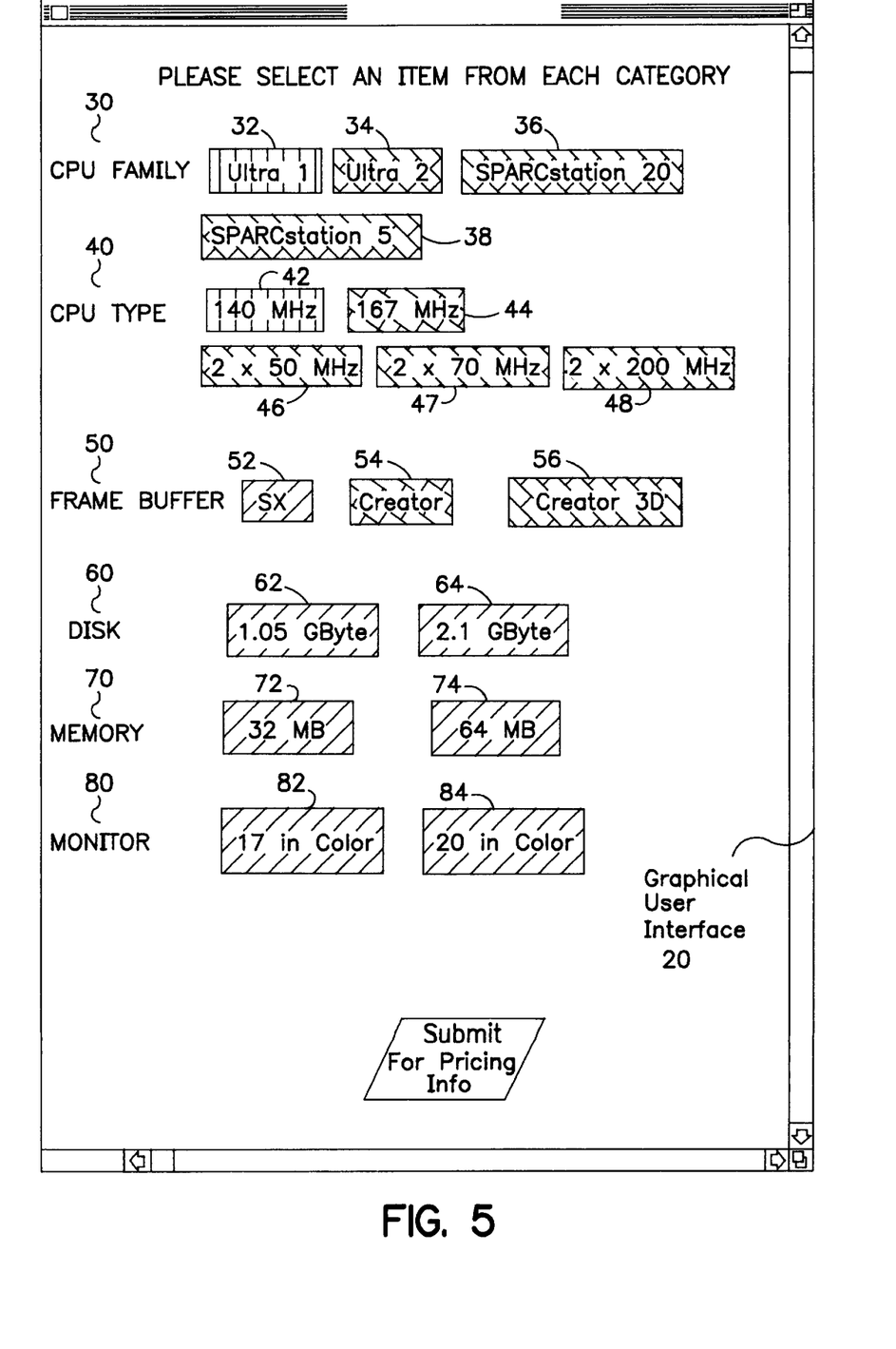
FIG. 5 is a screen capture of the interface when a button in both first and second categories have been selected.

Referring to FIG. 5, when button 42 (node 420) is selected, button 54 is grayed out and becomes unselectable since in FIG. 2 its corresponding node, node 540, is not linked with node 420. However, when button 44 (node 440) is selected, button 52 is grayed out because in FIG. 2 its corresponding node, node 520, is not linked to node 440 which corresponds to the selected button 44. A node 560, corresponding to button 56, is also shown in FIG. 2 as unlinked to either of the nodes 420 and 440 and is, therefore, grayed out and becomes unselectable upon the user selecting button 32 of the first bank. Thus, button 56 (node 560) is made unselectable before the user selects a button in the second bank such as buttons 42 and 44, since there is no path of links from node 320 (button 32 of the first bank) such that node 560 can be located by following the links.

The model of FIG. 2 shows that selecting button 52 of the third bank (node 520) maintains selectability of both the buttons in bank 4 of FIG. 4, namely, buttons 62 and 64 (nodes 620 and 640 respectively). Nodes 620 and 640 are linked to node 720 (button 72) and node 620 is additionally linked also to node 740 (button 74). Finally, node 720 (button 72) is linked to node 840 (button 84) while both nodes 720 and 740 are linked to node 820 (button 82). The status relations of the linked and unlinked nodes in banks 5 and 6 are similar to that described for the linked and unlinked nodes of banks 1 through 4 and will not be repeated. Though FIG. 2 only describes a nodal model starting with the node 320 (button 32), similar models starting with all the nodes of buttons in the first bank will have been generated prior to the invocation of the user interface.

Figure 3:
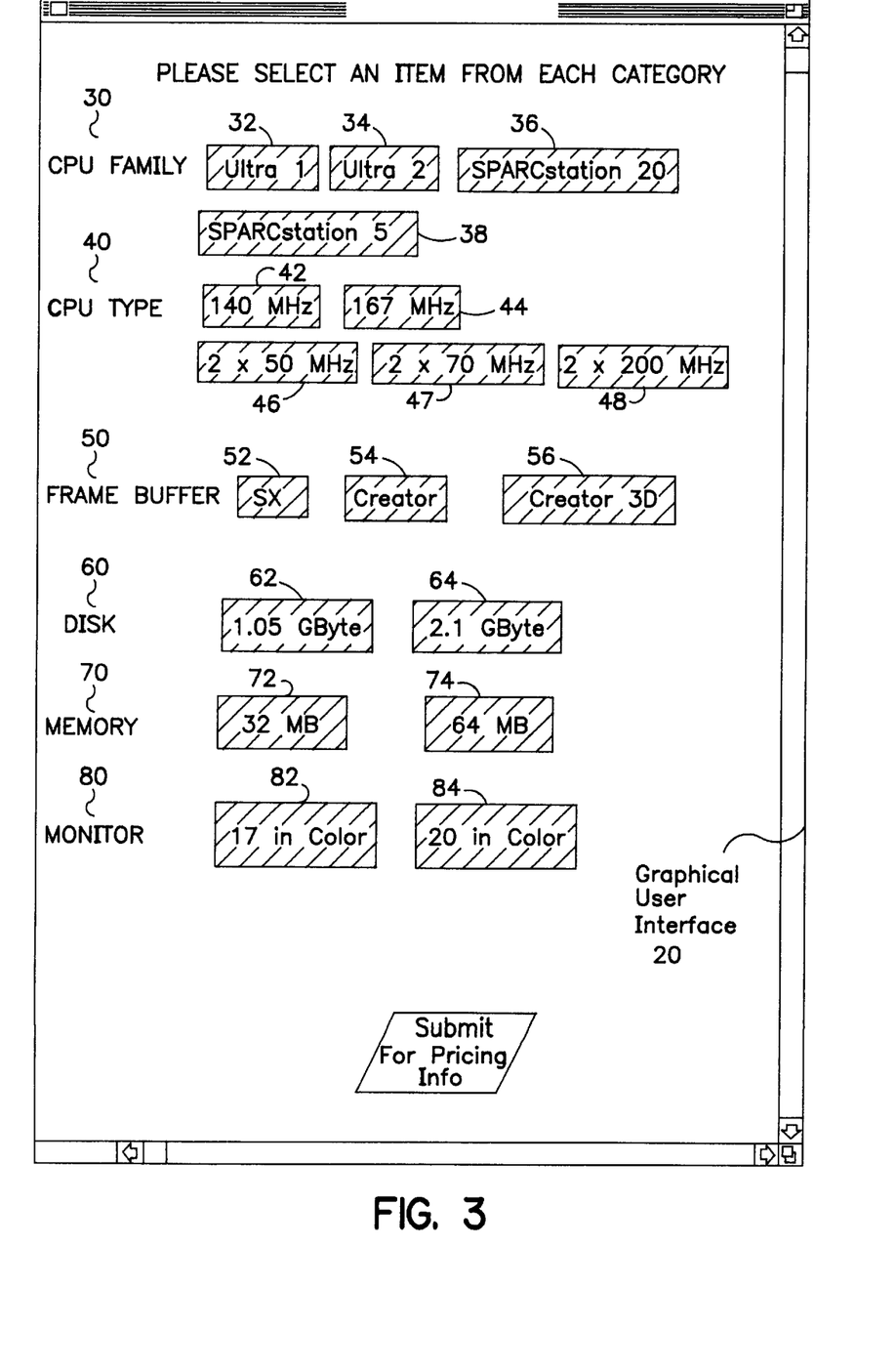
FIG. 3 is a screen capture of a button interface according to the present invention when the interface is initially invoked by the user.

FIGS. 3 through 6 show a screen capture of a user interface implementing the arrayed button control method of one embodiment of the present invention. Referring first to FIG. 3, a graphical user interface (GUI) 20 provides buttons or icons which may be manipulated by a user. This GUI 20 may be a World-Wide Web (WWW) browser, such as Netscape™ (A product of Netscape Communications Corp.) or any user interface from a software program implementing buttons or other selection devices. As such, the "Please Select an Item From Each Category" titled page shown in FIG. 4 may be displayed on GUI 20 upon connecting to the appropriate site that maintains that page. FIG. 3 shows a GUI relevant to the task of selecting a custom computer configuration and then pricing the configuration, or ordering it.

GUI 20 displays buttons 32, 34, 36, 38, 42, 44, 46, 47, 48, 52, 54, 56, 62, 64, 72, 74, 82 and 84. According to the control method of one embodiment of the present invention, these buttons are arranged on the same GUI by placing them in banks, wherein each bank represents a category. Each bank may be a single or multiple row of buttons. The categories which the banks represent are related to a task to be initiated by the user. The buttons shown on FIG. 3 are displayed and arranged according to six categories (banks), 30, 40, 50, 60, 70 and 80 to which they belong. Category 30 is the "CPU FAMILY" category and has four buttons 32, 34, 36 and 38, all in the first bank. Category 40 is the "CPU TYPE" category and has buttons 42, 44, 46, 47 and 48, all in the second bank. Category 50 is the "FRAME BUFFER" category and has buttons 52, 54 and 56, all in the third bank. Category 60 is the "DISK" category and has buttons 62 and 64, both in the fourth bank. Category 70 is the "MEMORY" category and has buttons 72 and 74, both in the fifth bank. Category 80 is the "MONITOR" category and has buttons 82 and 84, both in the sixth and final bank. The entire array of buttons shown in FIG. 3 are all colored green (indicated by dark southwest to northeast directional hatching) indicating that when GUI 20 is initially invoked, all buttons have the status of "selectable".

Figure 6:
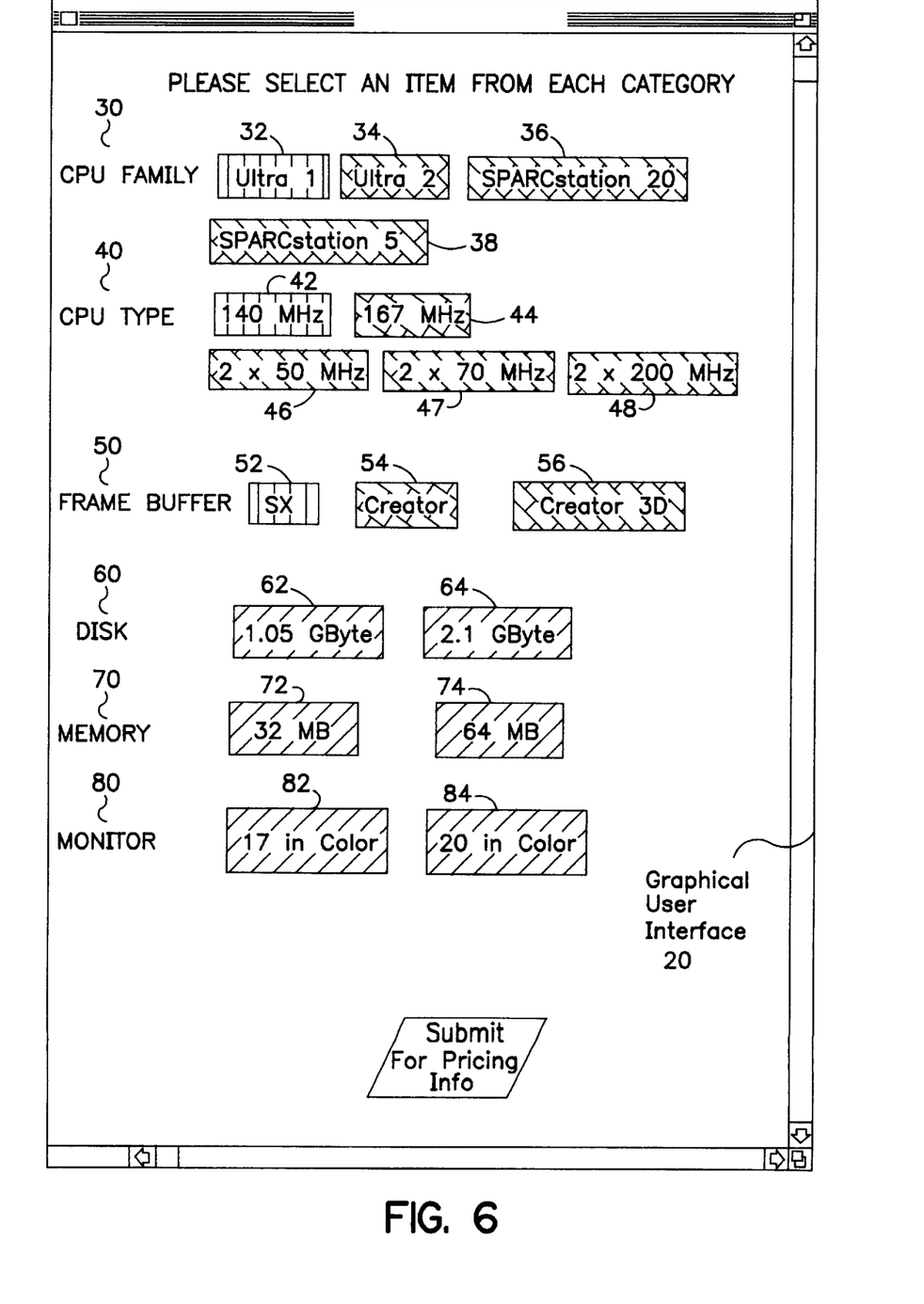
FIG. 6 is a screen capture of the interface when a button in the first, second and third categories have been selected.

FIG. 4 reflects the state of GUI 20 after the user has selected button 32 or the "Ultra 1" CPU FAMILY. FIGS. 4–6 described hereafter assume that the user has selected button 32 first before any other button. In accordance with the method described in FIG. 1, button 32 would be assigned a status of "selected" and drawn in a pink color (represented by vertical hatching) in contrast with the green color of FIG. 3 indicating a status of "selectable". Buttons 42 and 44 of the second bank and in the "CPU TYPE" category 40 have their nodes linked to the node of button 32 (see FIG. 2, node 320 shown linked to nodes 420 and 440), and in accordance with the method of FIG. 1, continue to have a "selectable" status and are displayed in the color green to so indicate. Buttons 46, 47 and 48 also of the second bank, however, whose nodes are not linked (unlinked) to the node corresponding to button 32, are displayed in a third color, such as gray (represented by light northwest to southeast direction hatching) indicating a updated status of "unselectable". In the next category, category 50, button 56 is also displayed in gray since, according to FIG. 2, its corresponding node is not linked through any path to the node corresponding to button 32. Thus, regardless of the selection of button made in the "CPU TYPE" category 40, the "Creator 3D" button, according to the model of FIG. 2, can never be chosen in category 50. Therefore, when the user attempts to select buttons 46, 47, 48 or even 56, the selection will be a null command and produce no change in status nor update of button colors.

Referring to FIG. 4, the selection of button 32 is shown to have no effect in changing the status and, thus, (color) of buttons 62 and 64 in category 60, buttons 72 and 74 in category 70, and buttons 82 and 84 in category 80. Referring to the nodal model of FIG. 2, these buttons remain in a selectable status because the nodes corresponding to the buttons of banks 4, 5 and 6 in categories 60, 70 and 80, respectively, can all trace back some path to the node corresponding to selected button 32.

FIG. 5 reflects the state of GUI 20 as displayed to the user upon the user selecting a button in the "CPU TYPE" category 40 (second bank). FIG. 5 assumes that the user has selected button 42 corresponding to a "140 MHz CPU". As with button 32 in FIG. 4, the selected button, button 42, is colored pink indicating its change in status from "selectable" to "selected". Further, since the node corresponding to button 44 (node 440) is not linked to the node corresponding to button 42 (node 420), the status of button 44 is changed to "unselectable". From the selection of button 32 of bank 1, buttons 46, 47 and 48 of bank 2 have already been marked "unselectable" (displayed in gray) and their status from that shown in FIG. 4 remains unchanged. As the nodal model of FIG. 2 shows, "FRAME BUFFER" category 50 (bank 3) is shown to have button 54 of bank 3 updated to a status of "unselectable" and, therefore, displayed in gray. Referring again to the nodal model of FIG. 2, the status of button 54 changes to unselectable because the node corresponding to the selected button 42 (node 420) is not linked with the node corresponding to button 54 (node 540). Button 52 of bank 3, whose node 520 is linked with the node corresponding to button 42, continues to have a "selectable" status and is thus displayed in green. Button 56 of bank 3 also continues its previous status of "unselectable" which was set upon the user selecting button 32 as shown in FIG. 4.

FIG. 6 reflects the state of GUI 20 as displayed to the user upon the user selecting a button in the "FRAME BUFFER" category 50 (third bank). According to the buttons selected in categories 30 and 40, now only one of the three buttons of category 50, namely button 52, continues to be "selectable" after selecting button 42 as shown in FIG. 5. Thus, the user is forced to select button 52, and FIG. 6 shows the state of the remaining buttons in categories 60, 70 and 80 once button 52 is selected. Alternatively, the choice of button 52 may be "selected" by the software for the user since only one button remains selectable in category 50 after selecting buttons 32 and 42. In either embodiment, though, button 52 is displayed in pink indicating that it has been selected. Since the node corresponding to button 52 (node 520) is linked to both of the nodes corresponding to buttons 62 and 64 (nodes 620 and 640) in category 60, both buttons 62 and 64 are displayed in green indicating their continued "selectable" status.

Likewise, the user will select buttons from categories 60, 70 and 80 and the GUI 20 will update its display according to the change in status of buttons as governed by the nodal model of FIG. 2. Once the user has selected a button in a sufficient number of categories, the user may submit the information for processing. In this context, the bottom of GUI 20 screen shows a "Submit for Pricing Info" action button 90 which, when selected, will pass the status of the buttons already selected in the six categories to a catalog which will calculate and return a total price for the configuration selected.

For instance, assuming that after the selecting of button 52, buttons 64, 72 and 82 are all selected by the user thereby completing the configuration. When the user thereafter selects the "Submit for Pricing Info" action button 90, the price of a system with a 140 MHz (button 42) "Ultra 1" (button 32) CPU with an "SX" Frame Buffer (button 52), "2.1 GByte" disk (button 62), 32 MB of memory (button 72) and a "17 in color" monitor (button 82), will be returned by a server or database application. The server or database application will price the system according to the buttons selected by the user, and thus according to the configuration of the computer chosen. An audio, text or graphics message through another screen of GUI 20 or other peripheral device such as a printer will be returned by the server or database application indicating the price of the chosen configuration. This price querying task through button (and therefore item) selection is an example of the types of tasks that can be executed or problems solved which have complex relationships. Further, since a database or server, as well as the nodal models upon which the relationships are based may change from instance to instance or time to time, the various embodiments of the present invention prevent the problem of a pricebook having to be sent to customers or updated on a timely basis and can more easily alleviate customer concerns regarding configurations that are available.

Further, since the database application or server is accessing the most current information (depending on the updates) to perform pricing, the price is assured to be the latest.

As mentioned earlier, the nodal model method can be implemented, for example, in scripts written for a "Web" page which is accessible over the Internet through a GUI such as Netscape (a product of Netscape Communications Corp.). Further functionality can be added by writing the scripts in a language such as Java which allows better interactivity with the GUI. Though "forms" have been implemented in various GUIs such as Netscape, which allow a user to select items from various categories and then submit them to a server, these "forms" do not change the selectability of buttons in one bank on the same GUI page (screen) based on other selections. Rather, these "forms" are static and do not toggle or allow for the status of buttons in one category to be affected by buttons of another category.

Figure 7:
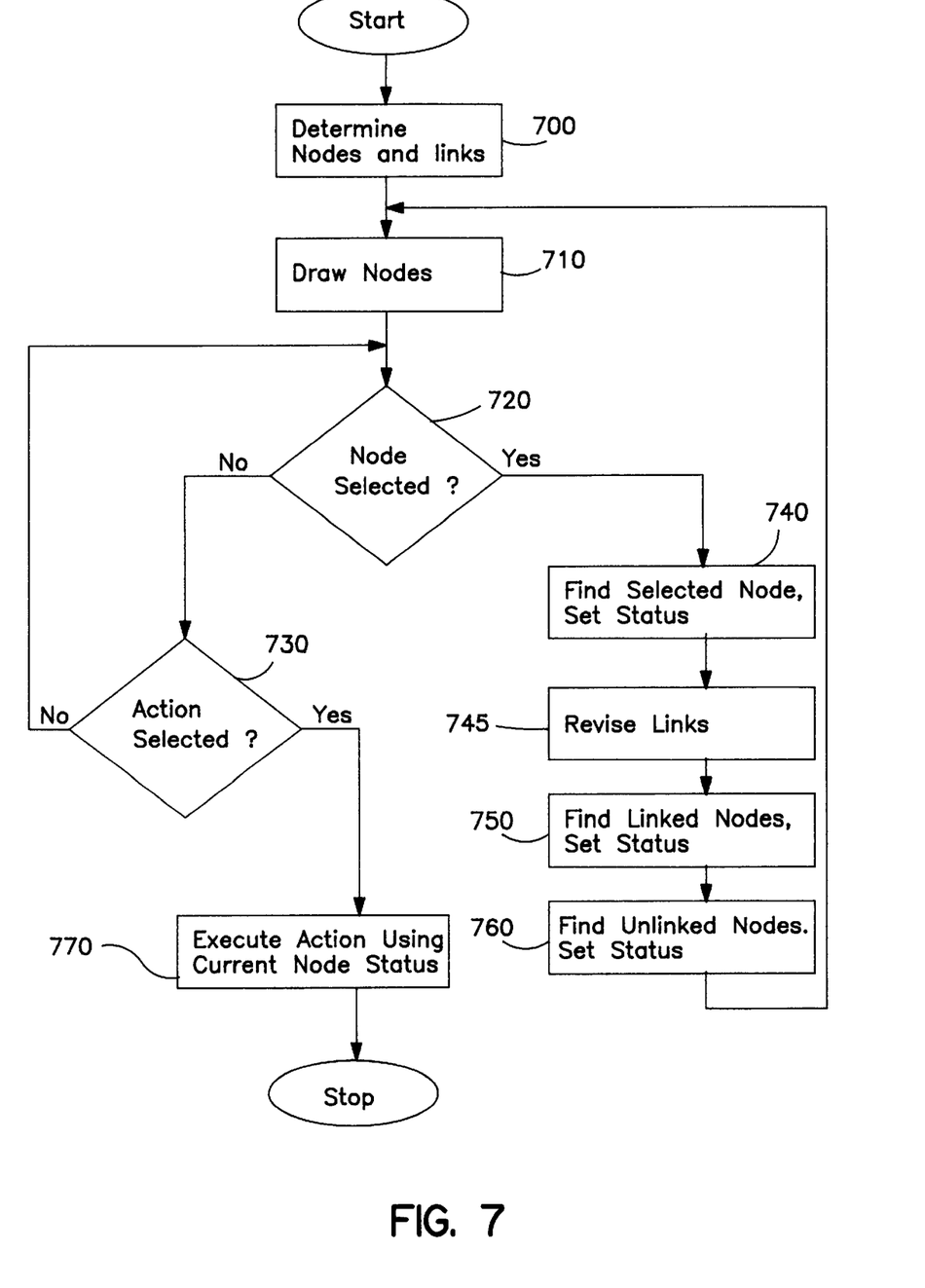
FIG. 7 is a flowchart of another embodiment of the present invention which is capable of revising links.

FIG. 7 is a flowchart of another embodiment of the present invention which is capable of revising links.

The steps 700, 710, 720, 730, 740, 750, 760 and 770 operate in a similar manner to the steps 200, 210, 220, 230, 240, 250, 260 and 270 of FIG. 1, respectively, with the following enhancement: adding a step 745 in the process to "revise links". Depending on the nature of the task to be executed or problem solved in response to the user's selection of buttons, a single level simple nodal model may not adequately represent the complexity of the task or problem. In these cases, all ordinarily "selectable" status buttons may in fact be "unselectable", based on prior selection, and therefore, there may be a need to revise the links in the model in a dynamic fashion to account for such special relations.

According to step 745 of FIG. 7, the prior "selected" nodes (buttons) are analyzed to find any future invalid paths of links. An invalid link path is eliminated after which the software determines the remaining links based on only valid prior paths. Once the links have been revised to eliminate any invalid paths, the software continues with step 750, which is identical to step 150 of FIG. 1 and the process of selecting continues.

Figure 8:
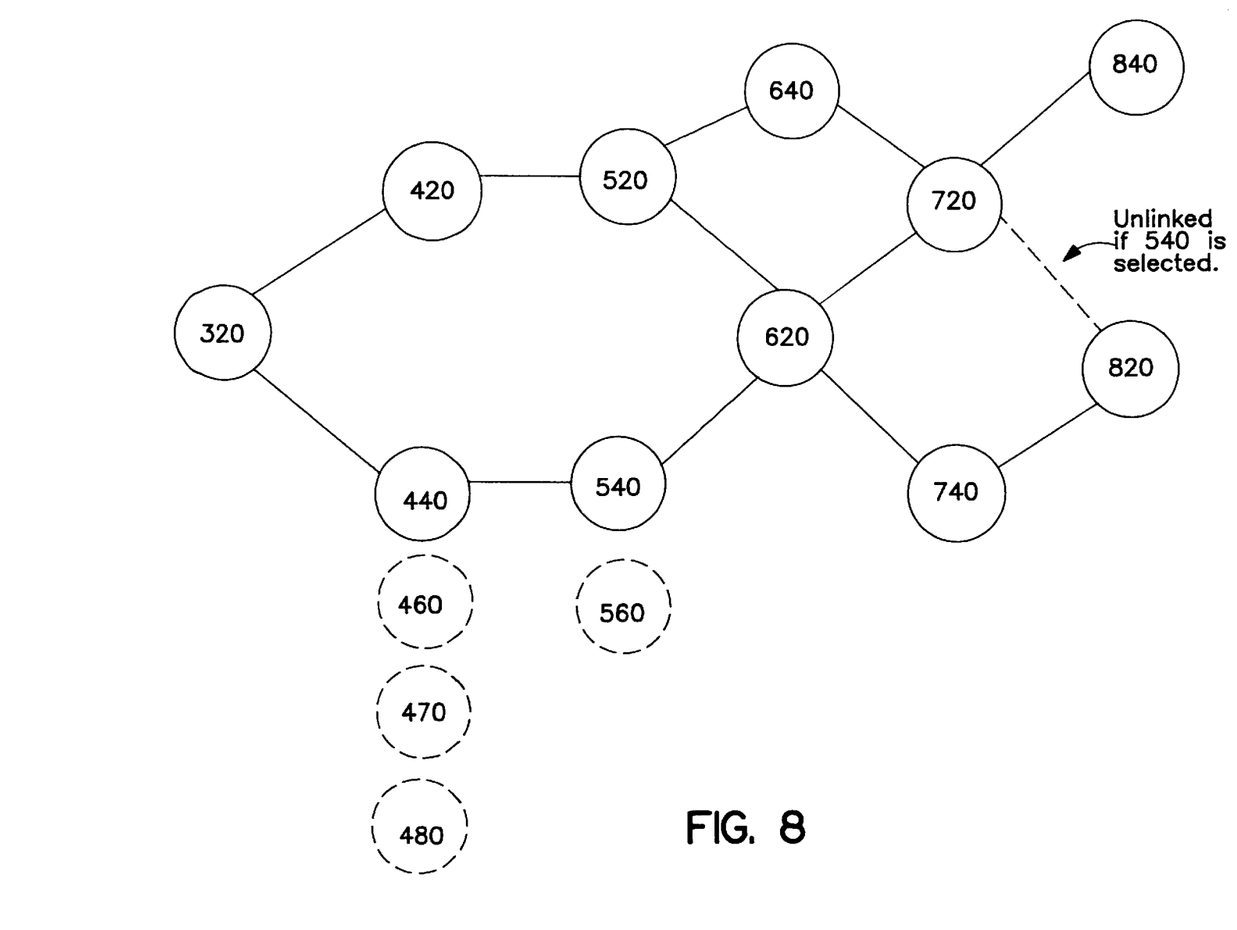
FIG. 8 shows the "invalid" path of links concept more clearly.

FIG. 8 shows the "invalid" path of links concept more clearly. FIG. 8 is similar to FIG. 2, except as described below.

FIG. 2 currently shows that, according to that nodal model, node 820 (button 82) will have a "selectable" status and can be selected whether node 720 (button 72) is selected or node 820 (button 82) is selected. However, there may a complex situation where if node 540 (button 54) was a prior selection, the link from node 720 to node 820 should be unlinked, indicating that with button 54 previously selected, button 84 can never be selected when button 72 is also chosen, and should become automatically "unselectable" despite the later selection of button 72 (node 720). Under an ordinary set of nodal models starting with a single node representing a button selection in the first bank of buttons, such a relationship is difficult, if not impossible, to characterize. However, by "revising links" according to step 745, the method of this embodiment, will, upon the selection by the user of button 54 (node 540), revise the model by eliminating the link between node 720 and node 820, and therefore immediately change the status of button 82 as "unselectable." The nodal model of FIG. 2 would thus be revised to look conceptually like FIG. 8 rather than FIG. 2 upon the selection of button 54 (node 540) to prevent the selection of button 82 (node 820) from a future choice of button 72 (node 720).

By revising links during the selection process, functionality is added to dynamically alter a complex status relation between two or buttons in different banks. In an alternative embodiment, a nodal model, in the example above, of node 540 may also be generated and logically combined with or replace the path of links from node 540 as shown in FIG. 2 to yield the same functionality.

Figure 9:
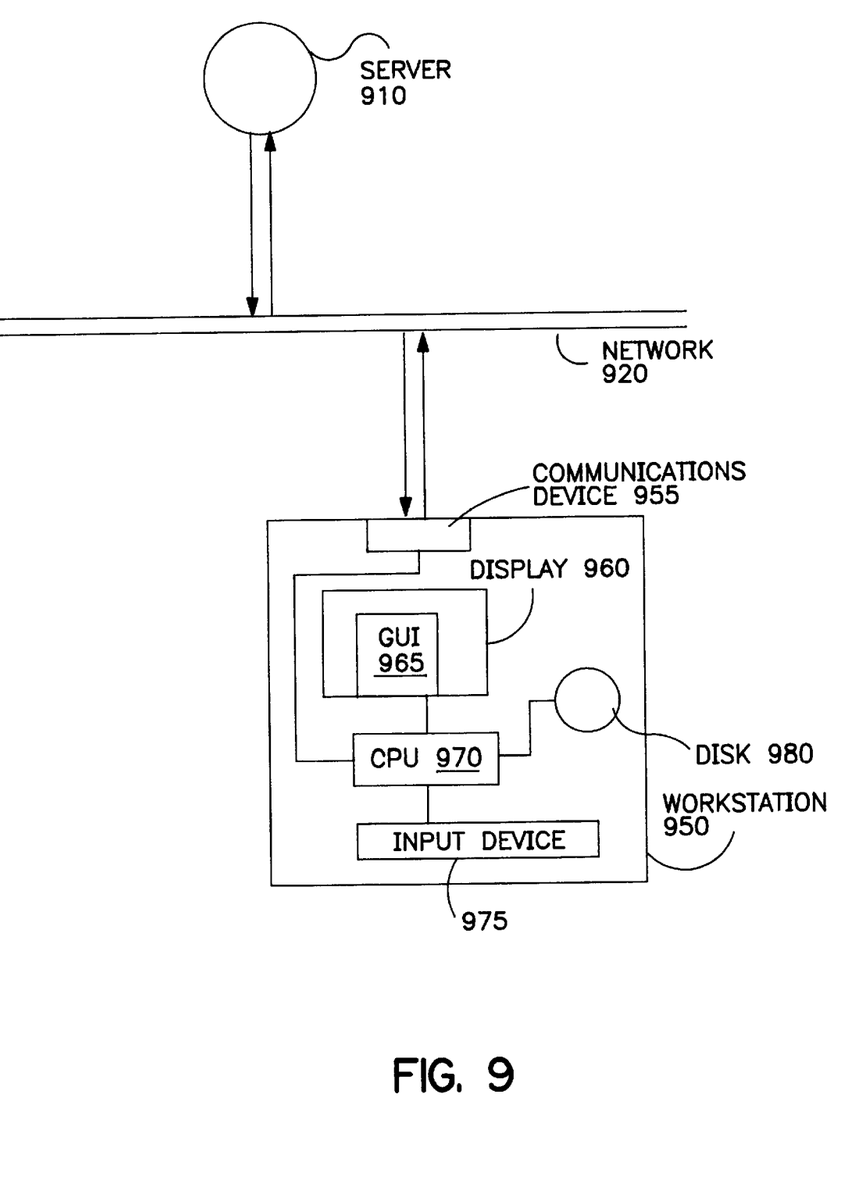
FIG. 9 shows a network and workstation embodiment of the present invention.

FIG. 9 shows a network and workstation embodiment of the present invention.

A network 920, which may be the Internet, Local Area Network, Wide Area Network or any other type of wired/wireless communications network, allows communication between a server 910 and a workstation 950. A user of workstation 950 will be able to select buttons, sliders, dials or other selection devices displayed on display 960 which is part of workstation 950 through input device 975, which may be a mouse or keyboard, and is also a part of or connected to workstation 950. Workstation 950 has a CPU 970 which can make computations, execute code and process data generated or requested by software or server 910 and has a disk 980 used for storing data and program code to be executed. Disk 980 may contain the data file for generating the nodal model and/or temporarily contain the nodal model generated by the present invention, but is preferably stored and updated on server 910. The method of the present invention may be implemented as code running on CPU 970 either as a part of a GUI 965 or a stand-alone application. GUI 965 is displayed on display 960 and visually communicates the selections made by the user, and is updated during the selection process according to changes in status as indicated by the nodal model. Workstation 950 can communicate data to and from server 910 on network 920 by using a communications device 955, which may be, for example, a modem, for the generation and updating of the GUI 965 as well as for the generation and updating of the nodal model. Server 910, upon the user selecting a task or action button on GUI 965, may execute the code, such as "Submit for pricing Info" and return the results of that task to the user on workstation 950 through communications device 955 based on the selected buttons which may correspond to entries in a database stored on server 910.

In an alternate embodiment, the generation of and updating of the GUI 965 and the nodal model may be performed without the aid of the server and can be local to workstation 950. In this embodiment, disk 980 will contain the necessary data for generating the nodal model and may store the nodal model once generated, as well as keep a record of the updated status of buttons as selections are made by the user. Further, CPU 970 may also be responsible for executing the task for which buttons were selected, upon the user selecting a task or action button on GUI 965.

Though the various embodiments of the present invention have been described as controlling buttons in a user interface, the control methods and system can be extended to other selection devices in a user interface, such as sliders where values in a range of values can be selected, dials where the position of the dial indicates a selection or even menu items and icons in a user interface which can be selected. For instance, extending the method and system of the present invention to a bank of slider devices rather than buttons, the selection of a particular value in one slider will affect the selectability of another slider by limiting its range of values from a previous state. In a menu or icon driven interface, certain icons may become unselectable upon a certain first icon being selected by the user.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for controlling a graphical array of buttons, in a user interface, each button having a status, said array composed of banks, each bank representing a category, said categories relating to a task, said method comprising the steps of:

generating a nodal model to represent said buttons;

displaying said graphical array of buttons on the user interface to distinguish buttons according to their status, said status including selected, selectable, and unselectable;

selecting a button, said selecting updating the status of other buttons according to said nodal model, said selected button remaining distinguishable;

repeating the steps of displaying and selecting until enough buttons are selected to implement said task; and implementing said task according to the selecting of buttons.

2. A method according to claim 1 wherein the step of generating a nodal model includes the steps of:

determining a node for each button of the array of buttons;

linking a node representing a button of one bank with nodes representing buttons of the next bank; and repeating the step of linking a node of one bank with nodes of the next bank for all nodes until said nodal model represents the status relation among all buttons in said graphical array.

3. A method according to claim 1 wherein the step of displaying includes displaying a button of the same status in the same color, wherein a change in status of a button causes a change in the color in which said button of changed status is displayed.

4. A method according to claim 2 wherein the status of a button in the first bank is changed if the user selects a button of the previous bank and if the node of said previous bank is not linked to the node of said first bank.

5. A method according to claim 1 further comprising the step of revising said nodal model to remove invalid links between nodes after and according to said selecting a button by the user.

6. In a computer system, having a CPU, disk, input device and display, a system for controlling a graphical array of buttons comprising:

a graphical user interface output on said display and generated by said CPU, said graphical user interface displaying and coupled to said graphical array of buttons, said graphical user interface coupled to said input device wherein said input device enables a user to select buttons displayed on said graphical user interface;

a nodal model generated by said CPU using data stored in said disk wherein said data represents the relationship of status among buttons, said status including selected, selectable and unselectable, said model including nodes and links between nodes, each node representing a distinct button on said graphical user interface; and an action button coupled to and displayed on said graphical user interface, said action button selectable by the user when a sufficient number of buttons from the graphical array of buttons have been selected, said selected buttons remaining distinguishable, said action button triggering execution of tasks on said computer system according to said selected buttons.

7. A system for controlling a graphical array of buttons according to claim 6 wherein said nodal model is revised after a predetermined one of said graphical array of buttons is selected.

8. In a network connecting a computer system with a server, said workstation having a CPU, disk, input device, a communications device and display, a system for controlling a graphical array of buttons comprising:

a graphical user interface output on said display and communicated over said network by said server, said graphical user interface displaying and coupled to said graphical array of buttons, said graphical user interface coupled to said input device wherein said input device enables a user to select buttons displayed on said graphical user interface;

a nodal model generated by said server using data stored in said server wherein said data represents the relationship of status among buttons, said status including selected, selectable and unselectable, said model including nodes and links between nodes, each node representing a distinct button on said graphical user interface; and an action button coupled to and displayed on said graphical user interface, said action button selectable by the user when a sufficient number of buttons from the graphical array of buttons have been selected, said selected buttons remaining distinguishable, said action button triggering execution of task on said server according to said selected buttons.

9. A system for controlling a graphical array of buttons according to claim 8 wherein said server returns a result of said task to said computer system using said network and said communications device.

10. A system for controlling a graphical array of buttons, said system comprising:

a graphical user interface displaying said array of buttons in a plurality of colors, each color indicating the status of the buttons wherein a first color indicates a selected status, a second color indicates a selectable status and a third color indicates an unselectable status, wherein more than one button is selected from the graphical array of buttons, said selected buttons remain in the first color after said selection;

a nodal model coupled to the graphical user interface, said model establishing status relations between said buttons, said nodal model having nodes representing said buttons and having links, each node coupled to other nodes by said links; and an action button selectable by the user when more than one button from the graphical array of buttons has been selected.

11. A system according to claim 10 wherein a button selected by a user will set the node corresponding to said selected button to a selected status.

12. A system according to claim 10 wherein the presence of a link between a first node and a second node indicates that upon a user selecting the button corresponding to the first node, the button corresponding to the second node will have a selectable status.

13. A system according to claim 10 wherein the absence of a link between a first node and a second node indicates that upon the user selecting the button corresponding to the first node, the button corresponding to the second node will have an unselectable status.

14. A method for controlling a graphical array of buttons, in a user interface, each button having a status, said array composed of banks, each bank representing a category, said categories relating to a task, said method comprising the steps of:

generating a nodal model to represent said buttons;

displaying said graphical array of buttons on the user interface to distinguish buttons according to their status, said status including selected, selectable, and unselectable;

selecting a button, said selecting updating the status of other buttons according to said nodal model;

repeating the steps of displaying and selecting with each selected button remaining distinguishable until enough buttons are selected to implement said task; and implementing said task according to the selecting of buttons.

* * * * *